Aug. 15, 1933.  R. J. CAUGHEY  1,922,881
HYDRAULIC CONTROL SYSTEM
Filed Feb. 25, 1932
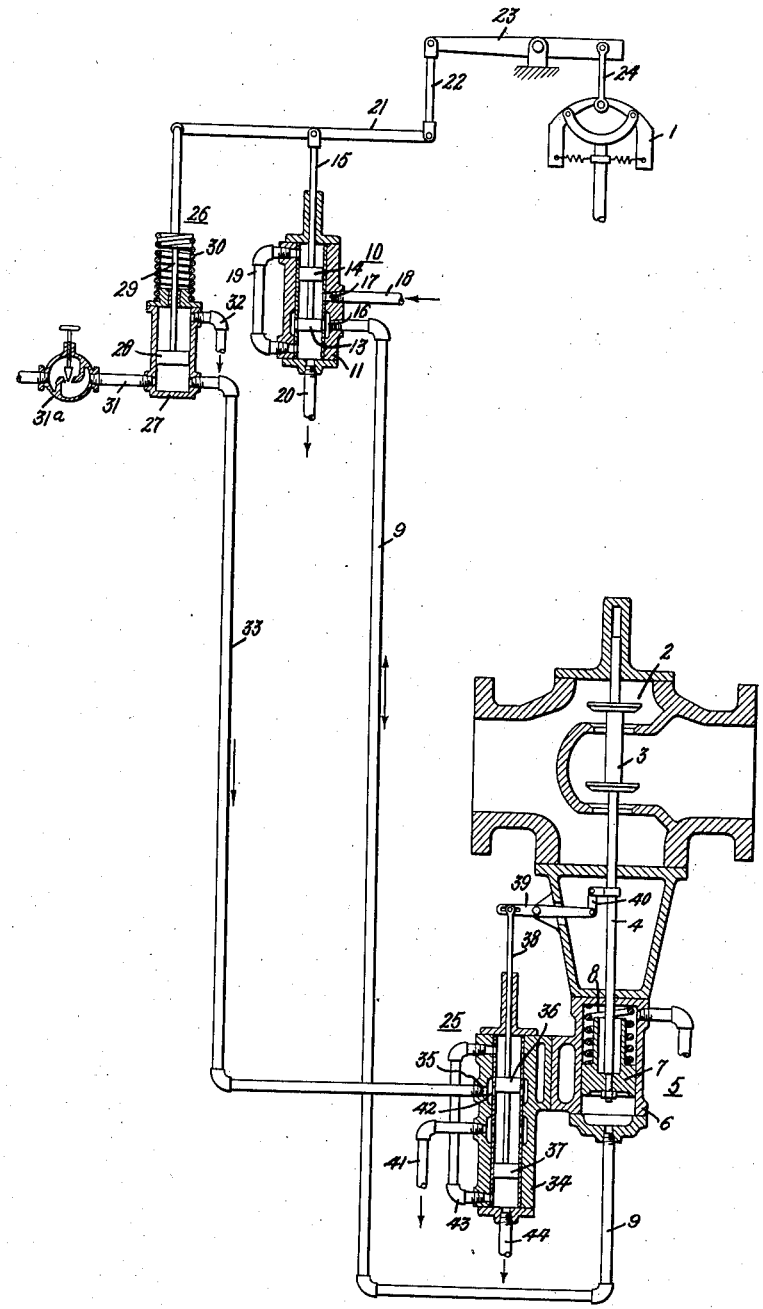
Inventor:
Reed J. Caughey,
by Charles Mueller
His Attorney.

Patented Aug. 15, 1933

1,922,881

UNITED STATES PATENT OFFICE 1,922,881

HYDRAULIC CONTROL SYSTEM

Reed J. Caughey, Schenectady, N. Y., assignor to General Electric Company, a Corporation of New York Application February 25, 1932. Serial No. 595,029

3 Claims. (Cl. 121—42)

The present invention relates to control systems in which the transfer of a movement of an element, which may be termed a regulating element, to another element which may be termed a regulated or controlled element, is effected by hydro-mechanical means. The invention relates particularly to arrangements as described in my Patent No. 1,814,827 in which the regulating element and the regulated element are arranged at a great distance from each other.

The object of my invention is to provide an improved arrangement for control systems whereby little time lag occurs between the actuation of the regulating elment and the response to such actuation by the regulated element.

For a consideration of what I believe to be novel and my invention, attention is directed to the following specification and the claims appended thereto in connection with the drawing which forms a part of the specification.

In the drawing I have shown, by way of example, a preferred embodiment of my invention in which the regulating element is represented as a speed governor and the regulated element as a valve means. Such an arrangement may be applied to a prime mover such as an elastic fluid engine for controlling the admission of elastic fluid in terms of speed, that is, in response to load, frequency, voltage, or like conditions as is well known in the art.

Referring to the drawing, 1 indicates a regulating element shown, by way of example, as a speed governor and 2 represents the regulated or controlled element, also shown by way of example as a valve means. The movable member 3 of the valve means is connected to the stem 4 of a motor 5. In the present instance I have shown a fluid actuated motor comprising a cylinder 6, a piston 7 movably arranged within the cylinder and fastened to the end of stem 4. 8 designates a spring arranged between the piston and the upper part of the cylinder casing for biasing the piston in a downward direction. Connected to the lower part of the cylinder is one end of a conduit 9 having its other end connected to a control means for the motor, in the present instance shown as an ordinary pilot valve 10 comprising a casing 11 and valve heads 13 and 14 fastened to a stem 15. Provided in the casing are openings or ports 16 and 17, the first of which is connected to the other end of pipe 9 and normally registers with valve head 13, and the second is connected to a pipe or conduit 18 through which fluid such as oil may be supplied, as indicated by an arrow, from a source, not shown. 19 represents a passage for discharging leakage oil from the upper part of the casing to the lower part of the casing, whence the oil is drained off through a conduit 20. The pilot valve is controlled by the speed governor. For this purpose I may provide a floating lever 21 pivoted to the stem of the pilot valve, a link 22 for connecting lever 21 to a fulcrumed lever 23 which in turn is connected by means of a link 24 to the speed governor.

The mechanism so far described is typical of any hydraulic regulating arrangement in which a speed governor serves for controlling a relay or pilot valve which in turn causes operation of a motor having a member for moving a valve to be regulated. The operation of this mechanism is as follows: Assuming the pilot valve is in its balanced position where valve head 13 registers with port 16. If now the speed governor changes its position, for instance due to an increase in speed, causing an outward movement of the flyweights, the fulcrumed lever 23 will turn in a clockwise direction, to the effect that link 22 and floating lever 21 cause an upward movement of the pilot valve heads. The head 13 thereby uncovers port 16 and permits oil from the lower part of the motor cylinder 7 being discharged through pipe 9 and drain pipe 20. The piston of the hydraulic cylinder 6 thereby moves downward under action of the biasing means or spring 8 and effects a movement of the movable member 3 of valve 2 towards its closing position.

If an actuation of the pilot valve in the opposite direction takes place, owing to a decrease in speed, valve head 13 moves downward and permits fluid, such as oil, to be supplied through supply conduit or pipe 18, conduit 9, to the lower part of cylinder 6. This causes an upward movement of the piston against the pressure of the spring whereby the movable member 3 of valve 2 is moved away from its seat, that is, towards opening position.

It is known to those skilled in the art that means must be provided in connection with a hydraulic motor moved by a pilot valve or relay, for restoring the original position of the pilot valve. The restoring actuation is generally effected by directly connecting the pilot valve to the motor such that movement of the motor, due to actuation of the pilot valve, causes in return a movement of the pilot valve but in a direction opposite to the original movement.

In the present instance a downward movement of the pilot valve causes an upward movement of piston stem 4 and this upward movement could be used to cause the pilot valve to resume its original position by directly connecting the right-hand end of lever 21 to stem 4.

A mechanical connection between lever 21 and piston 4 would be complicated in the present instance as it is assumed that the governor and the relay are provided at a considerable distance from the valve means and the motor.

According to my invention the restoring movement for the relay or pilot valve for the motor is achieved by hydro-mechanical means which include a valve means 25 and a pressure responsive means 26 having a member connected to the floating lever 21. The pressure responsive means 26 has been shown, by way of example, as comprising a cylinder 27, a piston 28 movably arranged therein and having a stem 29 pivoted to the left-hand end of floating lever 21. The piston of the pressure responsive means is thus floatingly connected to the pilot valve. This floating connection permits the pilot valve head 13 to assume its line to line position with the port 16 for any position of the piston 28 in the pressure responsive device. Fastened to the stem 29 is one end of a coiled spring 30 having its other end fastened to the cover of cylinder 27. The spring is normally under tension so that it biases piston 28 in downward direction. Connected to the lower part of cylinder 27 is a conduit 31 through which a fluid, such as oil, may be continuously supplied from any suitable source, not shown. For regulating or adjusting the fluid pressure I may provide a needle valve 31ª for conduit 31. The fluid under pressure in the lower part of cylinder 27 counteracts and normally balances the force of spring 30. 32 is a conduit through which leakage oil may be discharged from the upper part of cylinder 27. The oil supplied through conduit 31 to cylinder 27 is conveyed from this cylinder through a conduit 33 to valve 25. It will be readily understood that whereas the pressure of spring 30 normally balances the fluid pressure exerted on piston 28, movement of this piston is caused as soon as a change in fluid pressure takes place. For instance, if the fluid pressure decreases, the piston moves downward, due to the action of the spring, to such an extent that in its new position the tension of the spring again balances the fluid pressure. According to my invention the fluid pressure under piston 28 is changed in response to movement of the motor. This is accomplished by the provision of a flow restricting means 25 which in substance represents a valve through which fluid is conveyed and which is operated in response to movement of the motor. Thus conduit 33 and valve means 25 form in substance a means having a hydraulic resistance with respect to the flow of fluid therethrough which is changed in terms of movement of the motor. Valve 25 has been shown as comprising a cylinder 34 having a port 35 to which conduit 33 is connected. 36 and 37 are movable valve members fastened on a stem 38 which in turn is connected through a fulcrumed lever 39 and a link 40 to stem 4 of motor 5. 41 is a fluid discharge pipe and forms in substance a continuation of pipe 33. Valve head 36 normally covers a part of an orifice 42 and thereby causes a definite resistance to exist with respect to the flow of fluid from conduit 33 to conduit 41. 43 and 44 are conduits for discharging oil leaking to the upper and lower part of the cylinder.

In operation an upward movement of pilot valve 10 causes a downward movement of motor piston 7 whereby oil is displaced from the lower part of cylinder 6 through pipes 9 and 20 as explained above. A downward movement of piston 7 causes in turn through leverage 39, 40 an upward movement of valve head 36, to the effect that the resistance to the flow of fluid through conduit 33 to conduit 41 is decreased. This causes a decrease in pressure of the fluid contained in the lower part of cylinder 27, due to the fixed orifice in the needle valve, thereby permitting a downward movement of piston 28 under action of spring 30, resulting in a corresponding downward movement of the left-hand end of lever 21 and accordingly a similar movement of pilot valve head 13 whereby the latter resumes its original position and thus prevents further displacement of oil from the lower part of motor cylinder 6 through conduit 9.

If pilot valve head 13 is moved downward, due to action of the speed governor, and thereby causes an upward movement of piston 7, the latter movement causes an actuation of valve 25 whereby valve head 36 moves downwardly and thus increases the resistance to the flow of fluid from conduit 33 to conduit 41. This effects an increase in fluid pressure in cylinder 27, due to the fixed orifice in needle valve 31ª, whereby piston 28 is forced upward against the action of spring 30. This upward movement results in a similar movement of the left-hand end of lever 21 whereby the pilot valve head 13 is moved upward until it resumes its original position.

From another aspect the means for restoring the pilot valve to its original position includes a spring means 30 acting on the pilot valve through lever 21 and hydraulic means 25, 28, 31, 33 for normally balancing the force of the spring means and for causing movement of the pilot valve by automatically changing the resistance of the hydraulic means in response to motor movement.

From still another viewpoint the restoring means comprises a conduit through which fluid is conveyed, a valve means 25 for the conduit having a member connected to the motor and defining a variable orifice for the conduit whereby the hydraulic resistance to the flow of fluid through the conduit is changed in response to motor movement, and a device responsive to the pressure in the conduit and having a member connected to the relay or pilot valve.

One advantage of my improved control system is that the relay or pilot valve for the motor is directly actuated by the speed governor so that the time lag between the actuation of the speed governor or regulating means and the valve or regulated means is comparatively small. Another advantage of my arrangement is that the restoring movement of the relay takes place slowly whereby hunting is substantially prevented.

Having described the principle of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. In a control system, the combination of a regulated element, a hydraulic motor having a piston connected to the regulated element, a pilot valve for the motor provided at a considerable distance away from the hydraulic motor, a regulating means, a lever mechanism including a floating lever for connecting the regulating means to the pilot valve, and restoring means for the pilot valve including a cylinder, a piston in the cylinder having a stem floatingly connected to the floating lever, a conduit for supplying fluid to the cylinder, a spring counteracting the fluid pressure on the piston, another conduit for discharging fluid from the cylinder and a valve in the other conduit having a stem connected to the hydraulic motor, whereby the valve is automatically moved to change the resistance to the flow of fluid through the conduit in response to movement of the hydraulic motor.

2. In a control system a floating lever, a regulating element for moving the lever, a regulated element, means for moving the regulated element in response to movement of the regulating element, said means comprising a hydraulic motor connected to the regulated element, a pilot valve for the motor connected to the lever and means for restoring the pilot valve in terms of movement of the hydraulic motor comprising a pressure cylinder having a piston connected to the floating lever to permit the pilot valve to assume its line to line position at any position of said piston, spring means for biasing the piston in one direction and fluid under pressure acting on the piston in a direction opposed to that of the spring means, and means for varying the fluid pressure acting on the piston in terms of movement of the hydraulic motor.

3. In a control system, a regulating element, a regulated element, means for moving the regulated element in terms of movement of the regulating element, said means comprising a hydraulic motor connected to the regulated element, a pilot valve for the motor connected to the regulating element, means for restoring the pilot valve in response to movement of the motor, said last named means comprising a pressure cylinder having a piston, a floating connection between the piston and the pilot valve, means for biasing the piston in one direction, fluid under pressure for biasing the piston in opposite direction, and means for varying the fluid pressure in response to movement of the motor, said floating connection permitting the pilot valve to assume its line-to-line position for any position of said piston.

REED J. CAUGHEY.